Oct. 16, 1956 W. JUDA ET AL 2,767,135
ELECTROLYTIC TRANSFER OF SALTS
Filed Jan. 23, 1951 2 Sheets-Sheet 1

INVENTORS
WALTER JUDA
WAYNE A. McRAE
BY
Kinney, Jenney, Witter & Hildreth
ATTORNEYS Oct. 16, 1956  W. JUDA ET AL  2,767,135
ELECTROLYTIC TRANSFER OF SALTS
Filed Jan. 23, 1951  2 Sheets-Sheet 2

INVENTORS
WALTER JUDA
WAYNE A. McRAE
BY
*Kenway, Jenney, Witter & Hildreth*
ATTORNEYS 2,767,135
Patented Oct. 16, 1956

2,767,135

ELECTROLYTIC TRANSFER OF SALTS

Walter Juda, Lexington, and Wayne A. McRae, Boston, Mass., assignors to Ionics, Incorporated, Cambridge, Mass., a corporation of Massachusetts Application January 23, 1951, Serial No. 207,289

10 Claims. (Cl. 204—93)

This invention relates to the electrolytic transfer of salts from one solution to another and comprises a process and apparatus for removing salts from one solution while accumulating them in another.

Many industrial processes require the removal of ionizable salts from solutions, either for the purpose of purifying the solution or of recovering the salt. Distillation or evaporation and ion-exchange afford means for achieving these purposes, but both processes have proven unsatisfactory for many operations. Distillation or evaporation is necessarily relatively expensive and affords no means of separating salts from other dissolved material in the solution, and ion exchangers must be regenerated from time to time.

This invention provides a method and apparatus for removing continuously or batchwise certain ionizable salts from their solutions and transferring them to other solutions. Accordingly, it is possible either to purify solutions of salts or to concentrate the salts and recover them or both. The process further provides a method of salt transfer in which the energy requirements are extremely low, in some cases approaching the thermodynamically ideal energy requirements.

The process of this invention is applicable to solutions containing mobile ions, at least one species of which must be capable of undergoing reversible electrolytic deposition on an appropriate electrode. The process comprises an electrolysis between electrodes wherein the electrode reactions are mutually inverse and reversible, one reaction resulting in a deposition of ions and the other reaction resulting in the emission of similar ions. The electrolysis is carried out across a hydraulic barrier permeable to mobile ions of opposite charge from those involved in the electrode reactions. For convenience, the ions which are deposited or emitted at the electrodes are referred to hereafter as "active" ions, and those of opposite polarity which are transferred across the barrier are referred to hereafter as "transfer" ions. Mobile ions of like polarity with the active ions but which are not active are referred to as "non-active" ions. In the process of this invention the active ions are deposited on one electrode and transfer ions, being of opposite polarity, migrate away from that electrode through the barrier permeable to them, resulting in a removal of a salt of the active ions from the donor solution surrounding that electrode. At the other electrode active ions are emitted, maintaining electrical neutrality in the donee solution surrounding that electrode into which solution the transfer ions enter after permeating the barrier. The result is an increase in the concentration of a salt of the active ions in that solution.

Active and non-active ions may also contribute to the conductance of electrical energy across the barrier by permeating it in a direction opposite that of the transfer ions. The respective fractions of current carried across the barrier by the active ions, non-active ions, and transfer ions are represented by the transference numbers of the respective ions. At the electrodes all the current is carried into and out of the solutions by the deposition and emission of active ions. The passage of one Faraday of electricity causes at one electrode the deposition of one equivalent of active ions and the passage of one Faraday of electricity across the barrier, part of which is carried by transfer ions of opposite charge migrating away from that electrode and part by active ions and non-active ions migrating toward the same electrode. Only a fraction of an equivalent of active ions permeates the barrier and enters the donor solution, said fraction being the transference number of the active ions. The net result is a depletion of active ions in the donor solution by $1-t_a$ equivalents, where $t_a$ represents the transference number of the active ions. At the other electrode the same Faraday of electricity causes an emission of one equivalent of active ions. In the donee solution, therefore, there is an enrichment of active ions by $1-t_a$ equivalents, $t_a$ having permeated the barrier. In preferred embodiments of this invention barriers are used which are selectively permeable to transfer ions. In a completely selectively permeable barrier $t_a$ becomes zero, each Faraday of electricity resulting in a depletion of the donor solution by an equivalent of active ions, and all the current is carried across the barrier by transfer ions.

Active ions may be selected from a large group of anions and cations which may be electrolytically deposited and retained on an electrode of opposite polarity from the active ions and emitted from an electrode of like polarity.

Active cations include ions of any metal which may be electrolytically plated out of a solution of their salts. Included are copper, lead, iron, zinc, to name a few of the more common ones. Even such reactive metals as sodium may be plated from certain solutions, for instance, a sodium iodide solution in acetone. Anion activity results generally from the formation and decomposition of adherent insoluble salts of the anion on the electrodes. Examples are chloride with silver-silver chloride electrodes or mercury-calomel electrodes and sulfate with lead-lead sulfate electrodes.

As stated above, the electrode reactions are mutually inverse, each involving the same ion. For active singly-charged (univalent) anions the respective electrode reactions may be represented by:

At the anode: $A^- + X \rightarrow AX + e$
At the cathode: $AX + e \rightarrow A^- + X$ where $A^-$ represents the anion, $e$ represents an electron, and X represents a metal which forms an insoluble salt with A. For active singly-charged (univalent) cations the respective electrode reactions may be represented by:

At the anode: $C \rightarrow C^+ + e$
At the cathode: $C^+ + e \rightarrow C$ where C represents the cation. Electrode reactions involving polyvalent ions may be represented by similar equations with the appropriate coefficients. The electrode reactions may involve complex ions as well as simple ions. The term "reversible" as used herein refers to electrode processes, such as these, characterized by the ability of proceeding in both directions under appropriate voltage conditions. It will thus be seen that salts of active anions may be removed from the solution surrounding the anode and concentrated in the solution surrounding the cathode. In this case the two solutions must be separated by a barrier permeable to cations. Similarly salts of active cations may be removed from the solution surrounding the cathode and concentrated in the solution surrounding the anode, the two solutions being separated by a barrier permeable to anions.

Where several species of ions are present which, under proper conditions, could qualify as active ions for the purpose of this invention, the electrode activity of a particular species of ion depends in part on the relative deposition and emission potentials of the various ions, the voltage at which the cell is operated, the particular electrodes selected, the particular solvent present, and the relative concentrations of the various ions. Several species of ions may function as active ions or the voltage may be so controlled that only one active species at a time is involved in the electrode reactions. In any case electrodes must be selected which are capable of retaining and emitting the active ions reversibly.

The transfer ions present in the solution are by definition necessarily the mobile ions of opposite charge from the active ions. Macroscopically the number of equivalents of ions permeating the barrier equals the number of equivalents of active ions deposited from one solution and emitted in the other, and under preferred conditions the major portion of ions permeating the barrier are transfer ions. Where several species of transfer ions are present, the relative numbers of each which permeate the barrier, represented by their transfer numbers, depend in part on their respective mobilities, their concentrations, and upon the nature of the barrier. A barrier must be selected with reference to the system in which it is to be used, as explained below.

The barrier is preferably a charged membrane or diaphragm which is selectively permeable to the transfer ions and it is advantageous to choose a diaphragm having an electrical conductivity greater than $10^{-4}$ ohm$^{-1}$ cm.$^{-1}$ and a hydraulic resistivity greater than $10^{+3}$ atm. sec. cm.$^{-2}$. The electrical conductivity is the conductance in mhos of a centimeter cube of the material. The hydraulic resistivity is the pressure in atmospheres required to cause a flow of water of one cubic centimeter per second through a centimeter cube of the material. This property determines the efficiency of a barrier as a hydraulic separator. Preferred selectively permeable barriers carry transfer ions in a particular cell system as an ionic current which bears a ratio to the current carried by all other ions exceeding by at least 10 percent the same ratio in the same cell system without a barrier, or with a barrier having no selective properties. These properties of electrical conductivity, hydraulic resistivity and selective permeability exist as standards of performance in particular applications rather than as absolute characteristics of any given material, and depend on the particular system in which they are being used. Consequently, for a given application other than those specifically explained in the examples below it may be necessary to bring several membranes into a steady state operation in the solution which is to be treated according to this invention, and to measure the electrical conductivity, hydraulic resistivity and transfer qualities in order to select a preferred barrier.

Preferred diaphragms comprise ion exchange materials in the form of solid insoluble solvated amorphous polyelectrolytes having an ion exchange capacity in excess of $10^{-2}$ milliequivalents per gram of the material, calculated on the weight of barrier material after drying to constant weight at 105° C. They may be characterized as a submicroscopic network ionizable into mobile ions electrically held in the network and radicals of opposite charge chemically bonded to the network. The mobile ions may be replaced, as by familiar ion exchange techniques, by other ions of like charge, and in the process of this invention such ions of like charge constitute the transfer ions, which continuously pass through the diaphragm under the influence of an electric field. Ions of opposite charge from the transfer ions, including the active ions, are substantially repelled by the like charge of the network and are effectively blocked by the diaphragm.

Suitable diaphragms selectively permeable to cations may be formed from resins having active acidic functional groups, such as sulfonate and carboxylate, linked in the polymeric structure; suitable diaphragms selectively permeable to anions may be formed from resins having active basic functional groups, such as amine, quaternary ammonium hydroxyl, guanidyl, and dicyandiamidino, linked in the polymeric structure.

Selectively permeable barriers having utility in this invention may be prepared in accordance with the specification of our copending application Serial No. 103,784, filed July 9, 1949, now Patent No. 2,636,851. Examples of two typical membranes are described below.

The process of this invention may be carried out in a symmetrical cell divided into two compartments by a membrane of the desired barrier material, each compartment containing an electrode selected with respect to the particular active ions present in the solution to be treated. Preferably, however, the process of this invention is carried out in a series of cells, each separated from the adjacent ones by a partition or wall comprising the electrode material, and each being divided into anode and cathode chambers by a membrane comprising the barrier material. The electrode partition presents a cathode surface to one cell and an anode surface to the adjacent cell. In such a series of cells the bipolar electrodes function not only as a pair of electrodes but also as hydraulic separators defining adjacent cells. The mass of these electrodes is kept substantially constant by the simultaneous occurrence of one electrode reaction at one surface and the inverse reaction at the other surface—the emission of active ions from one surface occurs simultaneously with the deposition of active ions on the other surface. Only the terminal electrodes function as single electrodes. The solutions to be treated may be fed in batches or continuously, in series, or parallel, into or through the various anode and cathode chambers of the cells. Periodically the solutions are interchanged and the direction of the current reversed so that material deposited during one phase of the cycle is emitted (i. e. released) and so that electrode surfaces which have undergone dissolution are replenished.

The process of this invention may be carried out in the apparatus shown in the accompanying drawings in which.

Figure 4:
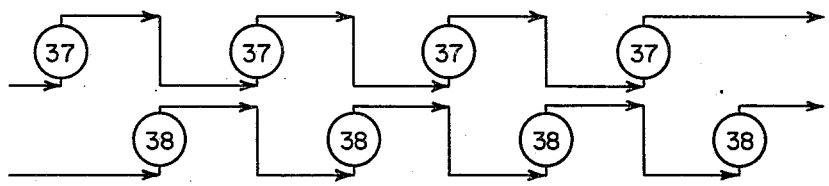
Figure 5:
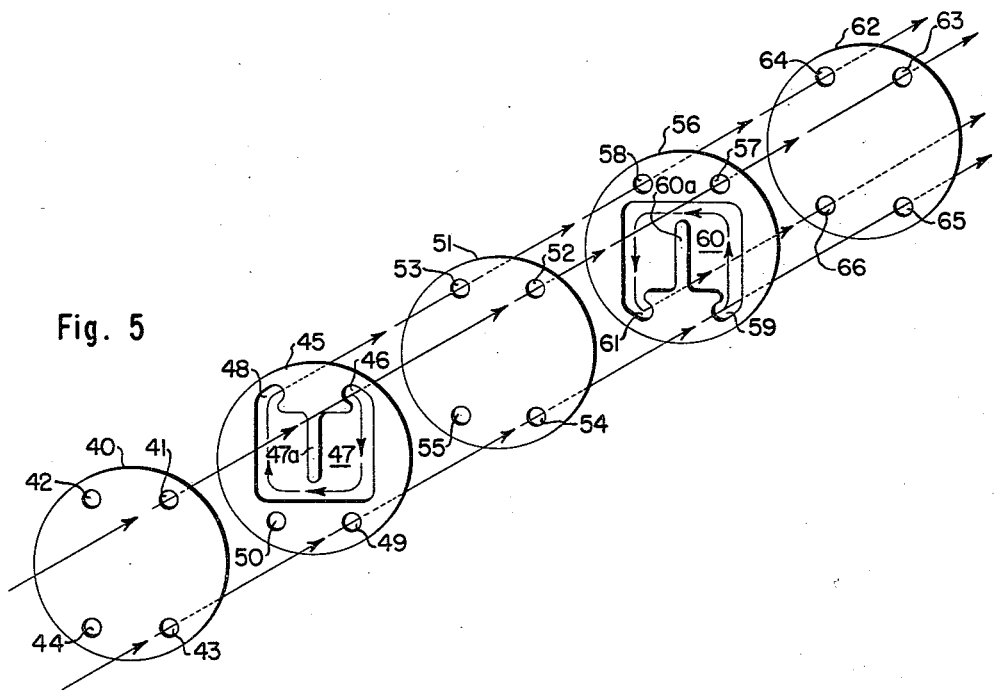
Figure 6:
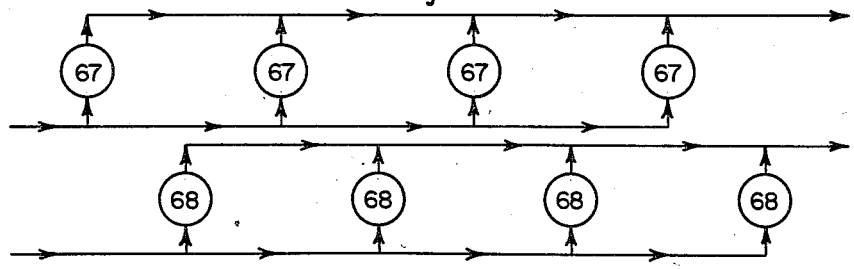

Fig. 4 is a schematic flow diagram showing the flow of solutions through a battery of cells connected hydraulically in series, Fig. 5 is an oblique view showing in exploded relation typical units comprising one cell of a battery of cells connected hydraulically in parallel, and Fig. 6 is a schematic flow diagram showing the flow of solutions through a battery of cells connected hydraulically in parallel.

Figure 1:
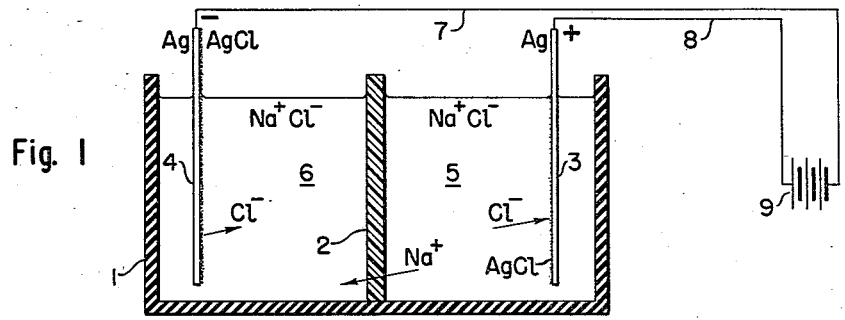
Fig. 1 is a diagrammatic elevation in cross section of a simple cell divided into anode and cathode chambers by a membrane.

The process of this invention in its basic embodiment may be carried out in the simple cell of Fig. 1. The solutions are held in a container 1 separated into anode and cathode chambers 5 and 6 respectively by the electrolytically conductive membrane 2. Electrodes 3 and 4 are present in the chambers 5 and 6 and contact any liquid contained within the chambers. Electrically conductive leads 7 and 8 connect the electrodes with a source of voltage, e. g. a D. C. battery 9.

Chloride salts of non-active cations may for example be transferred from the anode compartment to the cathode compartment by using an anode of silver and a cathode of silver chloride. An ion selective membrane, or a non-selective membrane such as insoluble polyvinyl alcohol may be used. In the latter case, if the cell is filled with an aqueous solution of sodium chloride and an electrolytic current is passed the following occurs: At the anode chloride is deposited as silver chloride at the rate of one equivalent of chloride per Faraday of electricity. Electrolytic current is carried across the membrane by ions of sodium moving toward the cathode and by ions of chloride moving toward the anode, according to their respective transference numbers of about 0.4 and 0.6. The anode solution thus loses 0.4 equivalents of sodium and gains 0.6 equivalents of chloride per Faraday of electricity, the net result being a depletion by 0.4 mols of sodium chloride per Faraday. At the cathode one equivalent of silver chloride is decomposed and one equivalent of chloride emitted per Faraday. The cathode solution has gained 0.4 equivalents of sodium and lost 0.6 equivalents of chloride per Faraday from the transfer of ions across the barrier, resulting in an enrichment by 0.4 mols of sodium chloride per Faraday.

When a substantial amount of the silver chloride on the cathode has been reduced to silver and a like amount of silver chloride has formed on the anode (these amounts being determined by practical considerations such as the adherence of the electrolytic deposits), the solutions may be interchanged and the polarity of the cell reversed to provide for its continuous operation or alternatively, the electrodes may be interchanged to achieve the same result.

Preferred barriers which are selectively permeable to cations may be used, such as the phenol-sulfonic acid-formaldehyde diaphragm described below, to allow for the transfer of amounts approaching one equivalent of sodium chloride from the anode solution to the cathode solution per Faraday of electricity. In such a material and in dilute solutions such as natural water supplies including certain brackish water the transfer number of sodium ions approaches 1.0 and a current transfer efficiency approaching 100% may be realized.

Figure 2:
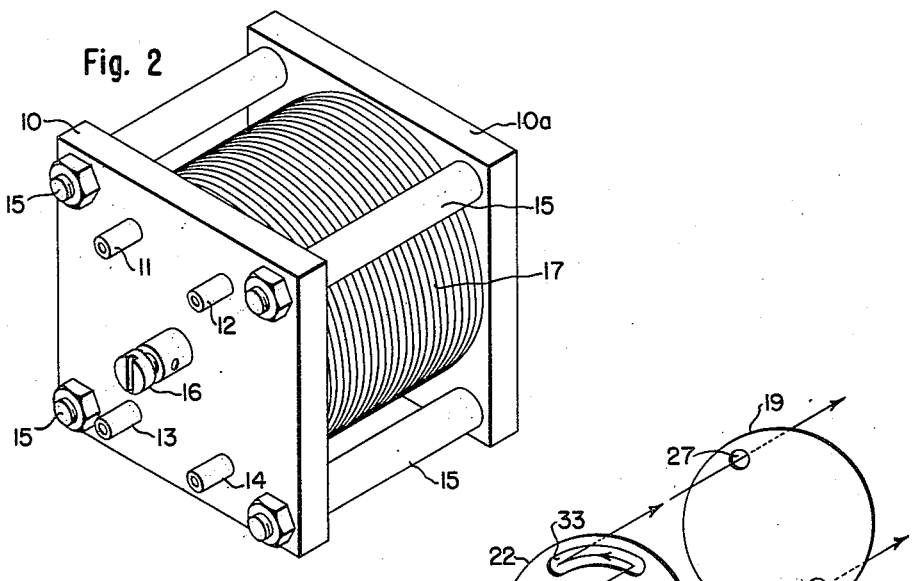
Fig. 2 is a perspective view of a battery of cells in electrical series.

A preferred apparatus for carrying out the process of this invention is shown in Figs. 2 through 6. Referring particularly to Fig. 2, a battery of cells 17 in electrical series is held between a pair of header-end plates 10 and 10a of insulating fabricating material, the assembly being held in tight compressional unison by means of the bolts 15 which engage the header-end plates. Each header is provided with four ducts 11, 12, 13 and 14 extending through said headers and terminating on the outer side in four tubes to which hydraulic coupling can be made to carry the solutions to and from the cells. Through the center region of each header extends a terminal bus 16 through which electrical contact may be made with the end electrodes of the battery of cells 17.

The battery of cells 17 comprises an array of alternate electrodes and barriers, each provided with appropriate ports through which the various solutions may flow. Electrodes are at each end and make contact, when the battery is assembled between the header-end plates 10 and 10a, with the terminal busses 16. The barriers and electrodes are separated by gaskets of insulating material with cut-out sections defining the respective anode and cathode chambers situated between the electrodes and barriers. Channels are provided in each gasket to allow one of the solutions to enter and leave the chamber defined by that gasket. Appropriate ports or channels are also defined to provide for the by-passing of the other solution around that chamber. The particular arrangement of the various ports and channels is determined by the location of the ducts 11, 12, 13 and 14 on the header-end plates 10 and/or 10a, and the particular order of hydraulic flow desired, whether series or parallel.

Figure 3:
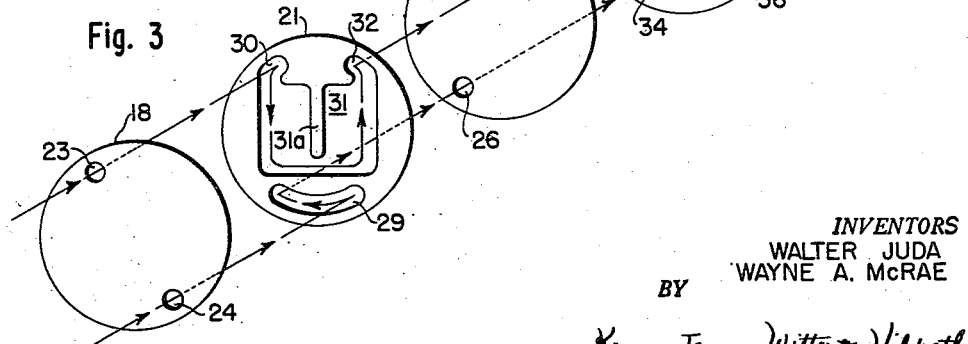
Fig. 3 is an oblique view showing in exploded relation typical units comprising one cell of a battery of cells connected hydraulically in series.

Fig. 3 shows the arrangement and configuration of the diaphragms and gaskets when series flow of both solutions is desired. The electrodes 18 and 19 are each provided with a pair of ports, 23—24 and 27—28, one of each pair of which is situated so as to overlie one of the ducts 11, 12, 13 or 14 of the header-end plate 10. As shown in Fig. 3 ports 23 and 27 are situated to overlie duct 11, and ports 24 and 28 are situated to overlie duct 14. In this case ducts 12 and 13 are not used and may be plugged by appropriate means. The barrier 20 similarly is provided with a pair of ports 25 and 26 each situated to allow for the passage of one of the solutions as it passes from the channels provided by the preceding gasket 21. The gasket 21 is cut out at the center region to define the chamber 31, a baffle 31a being provided to distribute the liquid through the chamber as it flows and to support the center regions of the diaphragms. Entry and exit to chamber 31 are provided by the channels 30 and 32 which respectively align with port 23 of electrode 18 and port 25 of barrier 20. Passage of the other solution is provided by the channel 29 which extends between the port 24 of the electrode 18 and the port 26 of the barrier 20. The gasket 22 is similar to the gasket 21 but placed in the opposite position. It is similarly cut out at the center to define the other chamber 35 of the cell, and has a similar baffle 35a. Entry and exit to the chamber 35 are provided by the channels 34 and 36 respectively, which respectively align with the port 26 of the barrier 20 and the port 28 of the electrode 19. Passage of the solution from the first described chamber 31 is provided by the channel 33 which extends between the port 25 of the barrier 20 and the port 27 of the electrode 19. From the electrode 19 the two solutions pass through subseqeunt cells in the same manner they flowed from the ports in the electrode 18. Any desired number of cells may be assembled from electrode and barrier units, similar to those shown, each separated from the adjacent barrier or electrode by one of the gaskets, and it will be seen that each solution will flow in series through its respective anode or cathode chamber, as shown diagrammatically in Fig. 4 where one series of chambers 37 is connected in hydraulic series, represented by the arrows showing the flow, and separated from the other series of chambers 38, also connected in hydraulic series. In the series cell arrangement shown in Fig. 3 the two solutions would enter through the ducts 11 and 14 of one header-end plate 10 and leave by corresponding ducts on the other header-end plate 10.

Fig. 5 shows the arrangement and configuration of the diaphragms and gaskets when parallel flow of both solutions is desired. In this case the electrodes 40 and 62 and the barrier 51 are each provided with two pairs of ports, 41—42; 43—44; 52—53; 54—55; 63—64; and 65—66, one of each pair of which is situated to overlie one of the ducts 11, 12, 13 or 14 of the header-end plate 10, and to align with the corresponding ports in the other diaphragms. The gasket 45 is cut out at the center region to define the chamber 47, a baffle 47a being provided to distribute the liquid as it flows through the chamber 47. Entry and exit to chamber 47 are provided by the channels 46 and 48 which respectively align with the ports 41 and 42 of the electrode 40 and with the ports 52 and 53 of the barrier 51. Passage of the other solution around chamber 47 is provided by the ports 49 and 50 which align with the ports 43 and 44 of electrode 40 and with the ports 54 and 55 of the barrier 51. The gasket 56 is similar to the gasket 45, but placed in the opposite position. It is cut out at the center to define the other chamber 60 of the cell, and is similarly provided with a baffle 60a. Entry and exit to the chamber 60 are provided by the channels 59 and 61, respectively which align with the ports 54 and 55 of the barrier 51 and with the ports 65 and 66 of the electrode 62. Passage of the solution feeding the first-described chamber 47 is provided by the ports 57 and 58 which align with the ports 52 and 53 of the barrier 51 and with ports 63 and 64 of the electrode 62. From the electrode 62 the two solutions pass into and out of the next subsequent cell in the same manner as they entered the described cell from the electrode 40. As with the cells arranged for hydraulic series flow, any desired number of cells may be assembled in electrical series from electrode and barrier units similar to those shown, each separated from the adjacent electrodes or barriers by one of the gaskets. It will be seen that the solutions flow through the respective anode and cathode chambers in parallel, entering each of one group of chambers by the ports and channels aligning with port 41 and leaving by the ports and channels aligning with port 42; and entering each of the alternate group of chambers by the ports and channels aligning with port 43 and leaving by the ports and channels aligning with the port 44. The parallel flow is shown diagrammatically in Fig. 6 where one group of chambers 67 is connected in hydraulic parallelism separately from the other group of chambers 68, also connected in hydraulic parallelism. In the parallel cell arrangement shown in Fig. 5 the solutions would enter the cells through the ducts 12 and 14 of the header-end plate 10 and be withdrawn by ducts 11 and 13 of the same header end plate 10 the ducts in the opposite header end plate 10a being plugged. Or alternatively ducts 11 and 13 may be plugged and the solution withdrawn through corresponding ducts on the opposite header-end plate 10a.

With the diaphragms and gaskets of the type shown in Figs. 2 through 6 other orders of flow than those explained above are also possible. For instance one solution may be conducted in series flow through its respective chambers while the other is conducted in parallel flow, the particular order being determined by the configuration of the diaphragms and gaskets as explained above. Another alternative is to provide for countercurrent flow of the two solutions by feeding one in through the header-end plate opposing the one through which the other solution enters. Still another alternative is batchwise operation which involves merely filling and emptying either or all the chambers.

Preferably the width of the chambers defined by the gaskets is kept as low as is practical to decrease the resistance of the electrolytic path and to maintain a minimum volume of solution in the cell in order to facilitate reversal of the cells without causing an appreciable amount of intermixing of the two solutions. To avoid electrical losses due to short circuiting of the cell by the electrolytic streams flowing through them the parts and channels should be as small as possible consistent with hydraulic pressure drop limitations. In preferred cells the gaskets are made of rubber sheeting 0.08 cm. thick and expose effective areas of electrode and barrier surfaces of 25 square centimeters. It will be understood however that nothing regarding the spacing of diaphragms and areas of chambers is critical and gaskets several centimeters thick may be used successfully.

Preferred barriers selectively permeable to cations may be made as follows:

EXAMPLE 1

| | Parts by weight |
|---|---|
| Phenol sulfonic acid, 65% in water | 50 |
| Formaldehyde, 35.4% in water | 24.7 |

The acid is added slowly to the formaldehyde while the temperature of the mixture is maintained at 0° C. Thereafter the mixture, at a temperature below 5° C., is poured into a mold containing a flat 12 x 12 mesh 15 mil woven saran (polyvinylidene chloride) screen to form a sheet or disk 0.08 cm. thick, and cured at 85° C. in a closed system substantially saturated with water vapor. The curing requires about three hours.

Other satisfactory selectively permeable cation membranes are described in our copending application mentioned above.

Preferred barriers selectively permeable to anions may be prepared as follows:

EXAMPLE 2

| | Parts by weight |
|---|---|
| Resorcinol USP | 11 |
| Pyrogallol | 12.6 |
| Guanidine hydrochloride | 19.1 |
| Aqueous formaldehyde USP (37%) | 32 |
| Metaformaldehyde | 9.1 |

The formaldehyde, metaformaldehyde and guanidine are mixed in these proportions and heated to 75° C. The pH of this solution is adjusted to 8.0 with 1 N sodium hydroxide and the pyrogallol and resorcinol are added with stirring. The solution is heated to 95° C., cooled immediately to 30° C. and poured at this temerature into a mold containing cotton gauze to form cast disks 0.08 cm. thick. The curing is carried out at 60–85° C. over a five hour period in a closed system in the presence of a saturated atmosphere of water vapor. The disks were removed from the molds and repeatedly soaked in excesses of 0.5 N sodium chloride solution.

Other satisfactory selectively permeable anion membranes are described in our copending application described above.

The following examples show specific application of the process of this invention to various electrolytic solutions.

EXAMPLE 3

*Transfer of chloride salts from aqueous solutions*

Five cells in electrical and hydraulic series were formed from six silver electrodes each having a thickness of 0.025 centimeters, five barriers produced in accordance with Example 1 each having a thickness of 0.08 centimeter, and ten rubber gaskets of the type shown in Fig. 3 each having a thickness of 0.08 centimeter. The effective areas of electrode and barrier exposed by the center portion of the gaskets were 25 square centimeters. Before assembling the cells the barriers were brought into equilibrium with a 0.305 N solution of sodium chloride, and one side of each silver electrode was provided with an electrolytic deposit of 0.035 ampere-hours of silver chloride. The battery of cells was assembled, as explained above, with electrodes at the ends and with the silver-chloride coated surfaces all facing the same way to provide a silver-chloride electrode at one end chamber and a silver electrode at the other end chamber.

An aqueous donor or first solution of 0.305 N sodium chloride was fed in series through the anode chambers, containing silver electrodes, at the rate of 3.5 cubic centimeters per minute, and a donee or second solution of 0.305 N sodium chloride was fed concurrently in series through the cathode chambers, containing silver-silver chloride electrodes, at the same rate. The battery of cells was connected with a source of direct current, of the proper polarity and a current of 0.210 amperes passed through the battery of cells, the potential required after five minutes of operation then being 2.0 volts. At this time the effluent donor solution from the anode compartments was 0.198 N in sodium chloride. After ten minutes the polarity of the cells was reversed, thus reversing the processes taking place in them. Since the donor and donee solutions entering the cells are identical no reversal of the feed was necessary. The potential required after ten minutes of operation to maintain a current of 0.210 ampere was 2.0 volts and the effluent of donor solution from the then anode compartments was 0.203 N in sodium chloride. The current transfer efficiency was 56%. Natural waters containing chlorides may be freed from chloride salts in this manner.

EXAMPLE 4

*Transfer of chloride salts from sugar solutions*

This example demonstrates the utility the process of this invention has in sugar refining. Five batteries of seven cells identical with the cells used in Example 3 were used except that the barriers were brought in equilibrium first with a 4.0 N solution of sodium chloride and then with distilled water prior to being assembled. Each battery comprised eight silver-silver chloride electrodes, seven barrier diaphragms, and fourteen gaskets. A 15% aqueous solution of cane sugar containing 395 parts per million (p. p. m.) of sodium chloride was fed in series through the anode compartments of the first battery and subsequently through the remaining batteries also in series flow. With respect to each other the batteries were in hydraulic series while their cells were also in hydraulic series. A solution of 0.01 N sodium chloride, as the donee solution, was fed countercurrently in series through the cathode chambers of each battery.

The sugar solution was fed at the rate of 44 cubic centimeters per minute. The 0.01 N sodium chloride solution was fed at the rate of 27 cc./min. into the first battery of cells, 27 cc./min. into the second battery, 32 cc./min. into the third battery, 34 cc./min. into the fourth battery, and 34 cc./min. into the fifth battery. A current of 0.090 amperes was passed through the first four batteries, and a current of 0.045 amperes through the fifth battery. The potentials required after fifteen minutes of operation were 9.0, 13.0, 19.0, 27.5 and 37.0 volts respectively. The concentrations of sodium chloride in the respective effluent sugar solutions were 291 p. p. m., 213 p. p. m., 146 p. p. m., 73 p. p. m., and 31 p. p. m. The polarity of the cells was reversed and the feed solutions and effluent solutions interchanged after the passage of every 700 cubic centimeters of sugar solution. The overall current transfer efficiency was 16%.

EXAMPLE 5

*Transfer of copper salts from an aqueous copper sulfate—sodium sulfate solution*

Five cells in electrical and hydraulic series were formed from six copper electrodes each having a thickness of 0.025 centimeters, five barriers produced in accordance with Example 2 each having a thickness of 0.08 centimeter, and ten rubber gaskets of the type shown in Fig. 3 each having a thickness of 0.08 centimeters. The effective areas of electrode and barrier exposed by the center portion of the gaskets was 25 sq. cm. Before assembling the cells into the batteries, the barriers were brought to equilibrium with a 0.4 N solution of sodium sulfate and then with distilled water. The cells were arranged for series hydraulic flow as shown in Fig. 3 and a donor solution 0.203 N in copper sulfate and 0.2 N in sodium sulfate was fed into the cathode chambers at the rate of 3.8 cc./min. A donee solution 0.197 N in copper sulfate was fed into the anode chambers at the same rate. A current of 0.140 ampere was passed through the battery of cells, the potential required after five minutes of operation being 8.5 volts. At this time the effluent of donor solution was 0.116 N in copper sulfate and 0.198 N in sodium sulfate. The effluent donee solution was 0.284 N in copper sulfate and less than .002 N in sodium sulfate. The current transfer efficiency was 70%.

It will be observed that in this example the active ions are copper, the transfer ions are sulfate and the sodium ions are non-active. Accordingly, not only is copper sulfate transferred from one solution to another, but it is transferred independently of salts of non-active ions, demonstrating a novel process for separating salts of active ions from salts of non-active ions.

EXAMPLE 6

*Transfer of bromide salts from aqueous solutions*

One cell identical to the cells of the battery of Example 3 was constructed using silver electrodes .025 cm. thick, the cathode having electrolytically depositd on one surface a coating of 0.030 ampere hour of silver bromide, and using a barrier of hydrous insoluble polyvinyl alcohol, cast by conventional techniques, having a thickness of 0.12 cm. Donor solution 0.048 N in sodium bromide was fed into the anode chamber and a similar solution was similarly fed into the cathode chamber, each at the rate of 2.5 cc./min. An electric current of 0.200 ampere was passed through the cell requiring, after five minutes of operation, a potential of 1.8 volts. At this time effluent donor solution was found to be 0.030 N in sodium bromide, while effluent donee solution was 0.066 N in sodium bromide, representing current transfer efficiency of 36%. The operation cycle in this application was seven minutes. This example demonstrates the process of this invention utilizing barriers which are not selectively permeable to the transfer ions.

EXAMPLE 7

A cell of the type described in Example 3 was formed containing five barriers produced in accordance with Example 1, each having a thickness of 0.08 centimeter. The effective areas of the silver electrodes and barriers exposed by the center portion of the gaskets was 25 square centimeters. Before assembling the cells, the barriers were brought into equilibrium with a solution 0.153 N in sodium chloride and 0.164 N in potassium nitrate and one side of each silver electrode was provided with an electrolytic deposit of 0.035 ampere hour of silver chloride. The battery of cells was assembled, as explained above, with electrodes at the ends and with silver chloride electrode at one end chamber and a silver electrode at the other.

An aqueous donor solution 0.153 N in sodium chloride and 0.164 N in potassium nitrate was fed in series through the anode chambers, having silver electrodes, at the rate of 3.5 cubic centimeters per minute and a donee solution of 0.305 N sodium chloride was fed countercurrently in series through the cathode chambers, having silver chloride electrodes, at the same rate. The battery of cells was connected with a source of direct current, of the proper polarity and a current of 0.110 ampere passed through the battery, the potential required after five minutes of operation being 2.0 volts. At this time the effluent donor solution from the anode compartment was 0.094 N in chloride, 0.123 N in sodium, and 0.132 N in potassium. The effluent donee solution was found to be less than 0.001 N in nitrate using the diphenyl benzidine-sulfuric acid spot test. The current transfer efficiency was 60%. In this example chloride ions are the active ions and nitrate ions are non-active. The process functions to separate chloride ions from nitrate ions. Sodium and potassium ions are the transfer ions.

EXAMPLE 8

A single cell of the type and construction of the multiple cell of Example 3 was formed containing a barrier produced in accordance with Example 1 which had been equilibrated with 95% ethylene glycol. The effective areas of the electrodes and barriers exposed by the center portion of the gaskets were 25 square centimeters. The membrane was 0.1 cm. thick and the gaskets were 0.08 cm. thick. The cathodic electrode had deposited upon it 0.030 ampere hour of silver chloride. A donor solution 0.310 N in sodium chloride in 95% ethylene glycol was passed into the anode compartment at 1.2 cc./min. A donee solution 0.310 N in sodium chloride in 95% ethylene glycol was passed into the cathode compartment at 1.2 cc./min. A current of 97 milliamperes was passed through the cell, requiring about 5 volts after seven minutes operation. At this time, the effluent donor solution was 0.273 N in sodium chloride. Current and hydraulic connections were reversed every fifteen minutes. The current transfer efficiency was 74%. This example demonstrates the applicability of the process of this invention to non-aqueous solution.

Any solutions which are electrolytically conducting when in the cells and which contain active ions when in the cells may be processed by this invention, and it will be seen from the examples that the two solutions may differ radically as to the concentrations, and the types of solutes present. They may also differ as to solvent provided, of course, that electrolytic conductivity is maintained in the cells by the presence therein of electrolytes (salts, acids or bases).

Although the examples show processes wherein the current density is lower than 10 ma./cm.$^2$ of diaphragm surface, current densities as high as 100 ma./cm.$^2$ have proven satisfactory, the permissible limit of current density being dependent in part on such factors as the species of active ions, the nature of the electrodes, the concentration of the electrolytes, the temperature of the cell and the extent to which current inefficiencies may be tolerated. Consequently maximum current density is an operating condition peculiarly related to the particular application of the process of this invention. The current density is also limited, in many cases, by the voltage limitations imposed by the ions and electrodes which are present. As pointed out above, the voltage must be such as to maintain mutually inverse electrode reactions, and where several species of ions are present the voltage must be adjusted and the electrodes selected so that the same ions deposited on one electrode are emitted at the other. Knowing the concentrations of the various ions, it is possible to calculate by well known approximations what the respective anode and cathode reactions will be for any type of electrode and what the voltage requirements will be. Accordingly, the electrode material must be selected so as to emit those ions which are deposited at the lowest potential, and the voltage must be limited so as not to cause the deposition or removal of ions which are not emitted, or the emission of ions which are not deposited. Control over the electrode material and over the voltage offers control over which of the several species of ions present will behave as active ions in a particular application.

In the operation of the process of this invention a net direct current component is required during each phase of the operating cycle, but the current oftentimes need not be constant in magnitude or sign. In some cases the electrolysis products are more uniformly and adherently deposited when the current is caused to vary in magnitude or sign as, for example, by superimposing an alternating current on a direct current or by interrupting a direct current.

Preferred embodiments of this invention utilize barriers which are selectively permeable to transfer ions, but as has been pointed out, non-selective barriers may also be used. Few, if any, barriers will transfer ions of one polarity exclusively of ions of the other polarity especially at high concentrations, and it will be understood that the term "selectively permeable" refers to the ability of the barrier to transfer preferentially ions of one polarity, the preference being relative to the transfer of the same ions either through a barrier having no selective properties or in the solution of the same ions without a barrier. Barriers having an electrical conductivity greater than $10^{-4}$ ohms$^{-1}$ cm.$^{-1}$ and a hydraulic resistivity greater than $10^3$ atms. sec. cm.$^{-2}$ maintain the solutions in particularly satisfactory hydraulic separation and electrical contact.

This invention provides an efficient controllable process for transferring salts of a particular species of ions, or group of species, from one solution to another and may be utilized to recover salts or solvent, to separate certain salts from other salts or from solutions of non-electrolytes, or to add salts to a solution, to name but a few applications. Control in continuous operation is offered by the variability of the rate of flow of the solution, the size of the cells and batteries, the magnitude of the current, and the particular barrier used.

Having thus disclosed our invention and described in detail preferred embodiments thereof so that any person skilled in the art may practice it, we claim and desire to secure by Letters Patent:

1. A method of removing salt from a first solution containing said salt to a second solution comprising: the steps of subjecting said solutions to direct current electrolysis between electrodes one of which is in contact with the first solution and the other is in contact with the second solution, said electrodes being reversibly retentive and emissive of one of the ionic species of like charge in said first solution, said solutions being separated by an electrolytically conductive hydraulic barrier permeable to ions having a charge opposite to that of the ions reversibly emitted and retained on said electrodes, the electrode in contact with said first solution having a charge opposite in sign to that of said reversible retentive and emissive ions, and periodically interchanging the solutions and simultaneously reversing the direction of electrolysis to provide for continuous operation.

2. A method of removing salt from a first solution containing said salt to a second solution comprising: the steps of subjecting said solutions to a direct electric current electrolysis between electrodes one of which is in contact with the first solution and the other is in contact with the second solution, said electrodes being reversibly retentive and emissive of cations of said salt in said first solution, said solutions being separated by an electrically conductive hydraulic barrier permeable to anions, the electrode in contact with said first solution being the anode and the electrode in contact with the second solution being the cathode, and periodically interchanging the solutions and reversing the direction of electrolysis to provide for continuous operation.

3. A method of removing salt from a first solution contining said salt to a second solution comprising: the steps of subjecting said solutions to a direct electric current electrolysis between electrodes one of which is in contact with the first solution and the other is in contact with the second solution, said electrodes being reversibly retentive and emissive of anions of said salt in said first solution, said solutions being separated by an electrically conductive hydraulic barrier permeable to cations, the electrode in contact with said first solution being the cathode and the electrode in contact with the second solution being the anode, and periodically interchanging the solutions and simultaneously reversing the direction of electrolysis to provide for continuous operation.

4. A method of removing salt from a first solution containing said salt to a second solution comprising: the steps of subjecting said solutions to direct current electrolysis between electrodes one of which is in contact with the first solution and the other is in contact with the second solution, said electrodes being reversibly retentive and emissive of one of the ionic species of like charge in said first solution, said solutions being separated by an electrolytically conductive hydraulic barrier selectively permeable to ions having a charge opposite to that of the ions reversibly emitted and retained on said electrodes, the electrode in contact with said first solution having a charge opposite in sign to that of said reversibly retentive and emissive ions, and periodically interchanging the solutions and simultaneously reversing the direction of electrolysis to provide for continuous operation.

5. A method of removing salt from a first solution containing said salt to a second solution comprising: the steps of subjecting said solutions to a direct electric current electrolysis between electrodes one of which is in contact with the first solution and the other is in contact with the second solution, said electrodes being reversibly retentive and emissive of cations of said salt in said first solution, said solutions being separated by an electrically conductive hydraulic barrier selectively permeable to anions, the electrode in contact with said first solution being the anode and the electrode in contact with the second solution being cathode, and periodically reversing the solutions and simultaneously reversing the direction of electrolysis to provide for continuous operation.

6. A method of removing salt from a first solution containing said salt to a second solution comprising: the steps of subjecting said solutions to a direct electric current electrolysis between electrodes one of which is in contact with the first solution and the other is in contact with the second solution, said electrodes being reversibly retentive and emissive of anions of said salt in said first solution, said solutions being separated by an electrically conductive hydraulic barrier selectively permeable to cations, the electrode in contact with said first solution being the cathode and the electrode in contact with the second solution being the anode, and periodically interchanging the solutions and simultaneously reversing the direction of electrolysis to provide for continuous operation.

7. A method of continuously transferring salts from a donor solution containing said salts to a donee solution comprising: the steps of passing the donor solution through alternate chambers formed between alternate electrodes and ion-permeable hydraulically impermeable partitions of a solvated gel material, said electrodes being alternately in contact with the donor solution and in contact with the donee solution, said electrodes being reversibly retentive and emissive of one of the ionic species of like charge in said donor solution, passing the donee solution into the remaining alternate chambers between said electrodes and barriers, subjecting said solutions while so alternately disposed to the passage of a direct electric current in series through said solutions and barriers in a direction to cause the deposition of said species of ions from said donor solution on the electrodes and the emission from the electrodes of said ion species into the donee solution, and periodically interchanging the alternate disposition of said solutions and simultaneously reversing the direction of the electrolytic current to provide for continuous operation whereby the salts of the donor solutions are transferred to the donee solutions.

8. The method of claim 7 wherein the ion-permeable hydraulically impermeable solvated gel barriers are selectively permeable to ions having a charge opposite to that of the electrodes in contact with the donor solutions.

9. An apparatus for continuously transferring salts from a donor solution to a donee solution comprising: an array of alternate electrodes and barriers defining a plurality of alternate anode and cathode chambers situated between said electrodes and barriers, said electrodes being reversible, retentive, and emissive of one of the ionic species of like charge in said donor solution, said barriers being ion-permeable, hydraulically impermeable solvated gel structures, means for passing the donor solution through one set of said alternate chambers and means for passing a donee solution through the remaining set of alternate chambers, electrodes at each end of the array for passing a direct electric current in series through said solutions and barriers in a direction to cause the deposition of said species of ions from the donor solution onto the electrodes in contact with said donor solutions and the emission from the electrodes in contact with the donee solution of said ionic species into the donee solution in contact therewith, means for periodically interchanging the alternate disposition of said flowing solutions in said alternate chambers and means for simultaneously reversing the direction of the electrolytic current.

10. The apparatus of claim 9 wherein the ion-permeable, hydraulically impermeable solvated gel barriers are selectively permeable to ions having a charge opposite to that of the electrodes in contact with the donor solution.

References Cited in the file of this patent

UNITED STATES PATENTS

| | | |
|---|---|---|
| 679,985 | Palas | Aug. 6, 1901 |
| 698,696 | Franchot | Apr. 29, 1902 |
| 1,235,063 | Schwerin | July 31, 1917 |
| 2,014,148 | Sievert | Sept. 10, 1935 |
| 2,251,082 | Theorell | July 29, 1941 |
| 2,636,851 | Juda et al. | Apr. 28, 1953 |

FOREIGN PATENTS

| | | |
|---|---|---|
| 20,192 | Great Britain | Sept. 9, 1909 |
| 420,402 | Great Britain | Nov. 30, 1934 |
| 310,099 | Great Britain | Apr. 25, 1929 |

OTHER REFERENCES

"Helvetica Chimica Acta," vol. 23, pages 795 through 800, paper by Meyer et al.